Aug. 27, 1963  M. W. HAGEN ETAL  3,101,624
MULTIPLE CONTROL MECHANISM
Filed Dec. 8, 1961  3 Sheets-Sheet 1
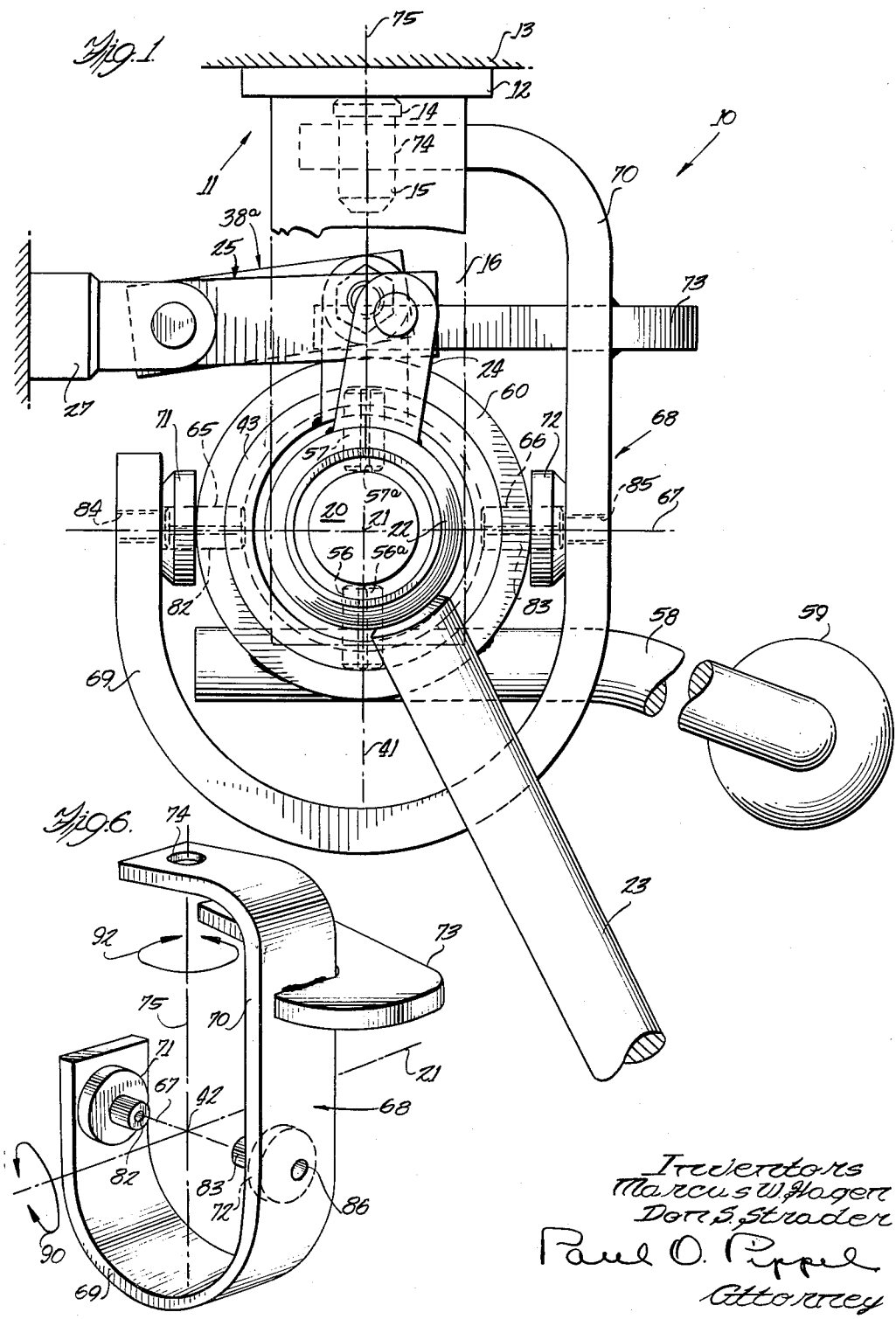
Inventors
Marcus W. Hagen
Don S. Strader
Paul O. Pippel
Attorney

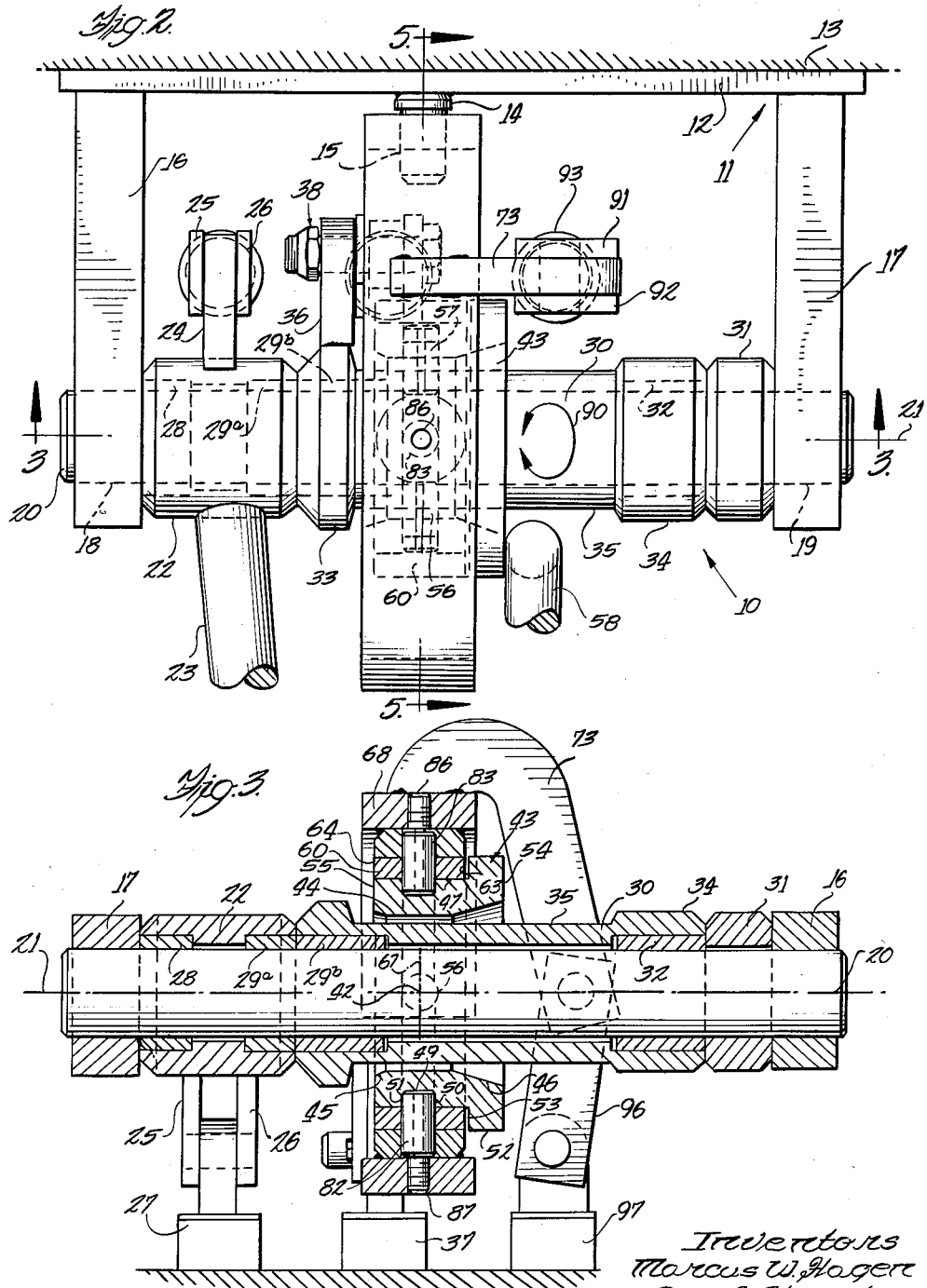

Aug. 27, 1963     M. W. HAGEN ETAL     3,101,624
MULTIPLE CONTROL MECHANISM
Filed Dec. 8, 1961     3 Sheets-Sheet 3
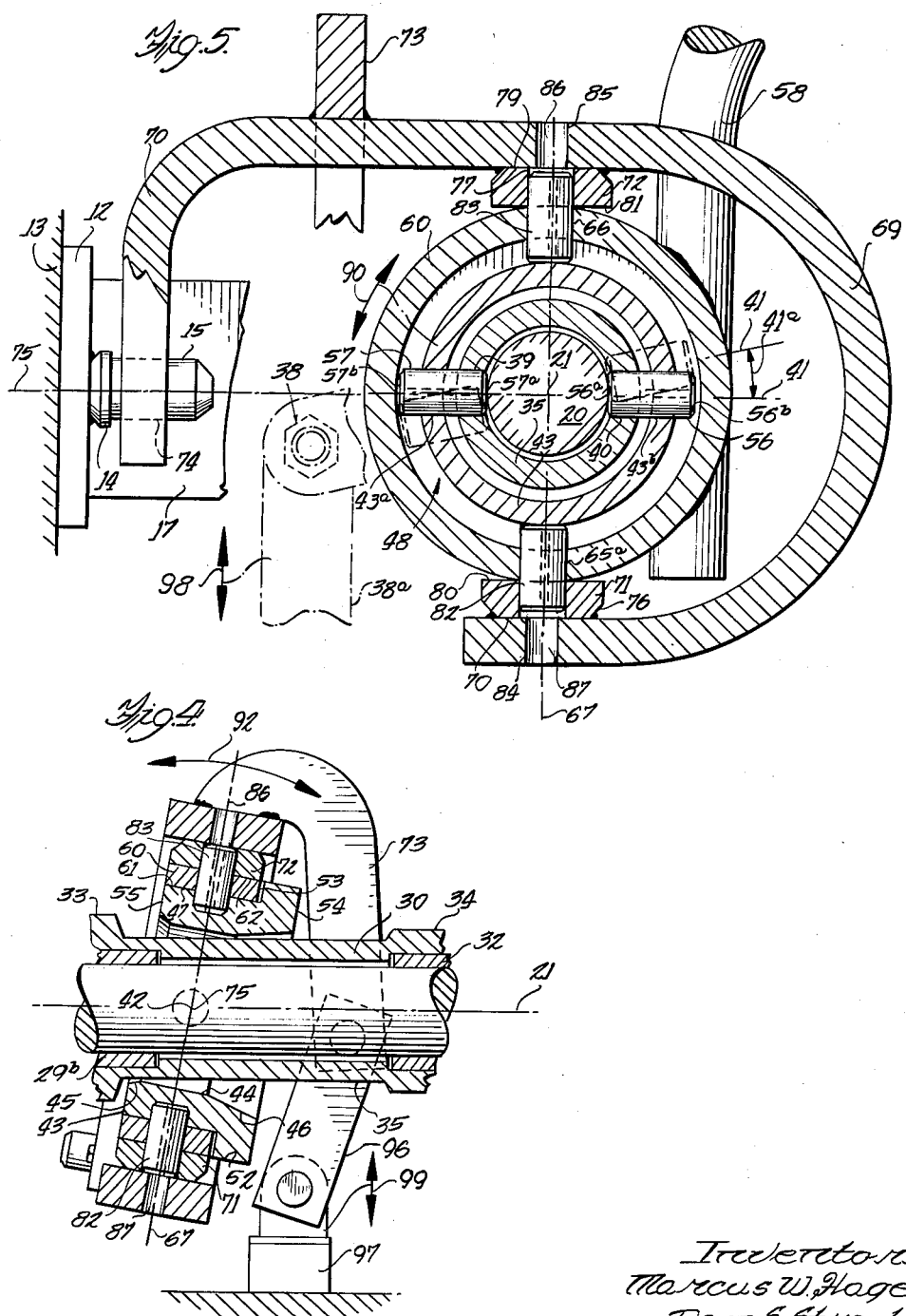
Inventors
Marcus W. Hagen
Don S. Strader
Paul O. Pippel
Attorney

United States Patent Office 3,101,624
Patented Aug. 27, 1963

3,101,624
MULTIPLE CONTROL MECHANISM
Marcus W. Hagen, Kenosha, Wis., and Don S. Strader, Mount Prospect, Ill., assignors to The Frank G. Hough Co., a corporation of Illinois
Filed Dec. 8, 1961, Ser. No. 158,091
10 Claims. (Cl. 74—471)

This invention relates to a multiple control mechanism and more particularly to a mechanism by which different control functions are accomplished by pivotal movement of a single control lever in different planes.

In tractor vehicles carrying controllable accessories and allied equipment a large number of different control operations are required to control not only the direction and speed ratio of the tractor vehicle but several different operational movements of the accessory or allied equipment. When separate control levers are provided for each separate operation a large number of levers result which produce a difficult mounting space problem which may be confusing to the operator. To relieve this situation it has been proposed to control a plurality of different functions to a single control lever movable in different planes.

The present invention relates to a control mechanism of this general type and particularly to a mechanism by which the bucket position of the tractor vehicle is controlled by pivotal movement of a control lever in a plane generally transverse to the supporting frame of the control mechanism on the tractor vehicle and the movement of the accessory is controlled by additional pivotal movement of the same lever in any one of a plurality of planes generally longitudinal of the supporting means of the tractor vehicle. The mechanism further provides pivotal movement of the same lever so as to control the bucket or accessory movement simultaneously or independently.

It is an object of the instant invention to provide a multiple control mechanism which is simple to construct and which is freely movable in different directions to perform different control operations.

Another object of the invention is to provide a control lever mounted for universal pivotal movement about a fixed point on a control mechanism mounted on the tractor with the control arms mounted on the multiple control mechanism to rotate about axes which are perpendicular to each other and which are connected respectively to control devices for controlling different operations.

Another object is to provide a multiple control mechanism in which the lever can be independently or simultaneously pivotally moved in a generally transverse plane or a longitudinal plane to control independently or simultaneously one function or two functions of operation.

Still another object is to provide a multiple control mechanism in which the control lever when pivotally moved generally in a transverse plane the supporting means for the control mechanism actuates the control arm for operational movement of the bucket.

Another object is to provide a muliple control mechanism in a tractor vehicle in which the control lever when pivotally moved in any longitudinal plane to the supporting frame of the mechanism will actuate the control arm to operationally move the accessory.

Another specific object is to provide a multiple control mechanism in which the control lever can be pivotally moved about a generally transverse plane or longitudinal plane of the supporting frame on the tractor vehicle to control respectively simultaneously or independently the control arm for the bucket operational movement.

Other objects and features of the present invention will be apparent upon a perusal of the following specification and drawing of which:

FIGURE 1 is a left side elevational view of a multiple control mechanism for a tractor vehicle constructed according to the present invention;

FIGURE 2 is a top elevational view of FIGURE 1 to further illustrate the multiple control mechanism constructed according to the present invention;

FIGURE 3 is a section on the line 3—3 of FIGURE 2 showing a cross section of the multiple control mechanism along the longitudinal axis of the supporting shaft;

FIGURE 4 is a fragmentary sectional view similar to FIGURE 3 but with the multiple control mechanism in an operating position for actuating one of the control arms;

FIGURE 5 is a section along the section line 5—5 of FIGURE 2 through the bail member of the multiple control mechanism of the present invention; and FIGURE 6 is a perspective view of the bail member of the present invention to provide a further understanding of the axes related to the bail member.

The present embodiment is the preferred embodiment but it is to be understood that changes can be made in the present embodiment by one skilled in the art without departing from the spirit and scope of the present invention.

Turning next to a detailed description of the present invention, continued reference is made to the drawings wherein like reference characters designate like or corresponding parts throughout the several views. The multiple control mechanism is generally indicated by the reference number 10 in FIGURES 1 and 2, and comprises a supporting frame generally indicated by the reference number 11 which includes a base portion 12 fastened to a frame portion of a tractor vehicle indicated by the number 13. Also on the base portion 12 is a projection means 14 including a cylindrical shaft portion 15 that will be discussed hereinafter in further detail. The projection means 14 can be attached to the base portion 12 in any suitable manner such as welding. Extending outwardly from the support 11 are a pair of members 16 and 17 each having a bore 18 and 19. A shaft 20 having a first axis 21 is fixedly mounted between members 16 and 17 in the bores 18 and 19.

A control mechanism not constituting a part of the invention is shown in FIGURES 1-2 in relation with the present invention for purposes of illustration only will now be discussed below. The control mechanism comprises a hub member 22 mounted on shaft 21 for relative rotation through bearings 28 and 29a. An operator control lever 23 and a control arm 24 are connected to the member 22 by any suitable means within the skill of the art. The control arm 24 is connected to the boom control rod 27 through connecting linkage 24 and 26. When the control lever 23 is actuated by the operator the hub 22 rotates about the axis 21 of shaft 20 through sleeve bearings 28 and 29a. The rotation of the hub 22 will actuate the control arm 24 and in turn the control rod 27.

Immediately to the right of the hub member 22 in FIGURE 2 is the multiple control mechanism that pertains to the present invention and will now be discussed below. Hub member 30 and a spacer 31 along with previously discussed hub member 22 assure a rigid and firm assembly between the extension members 16 and 17. The hub member 30 can rotate relative to the shaft 20 about its axis 21 through the bearings 29b and 32. Shoulder portions 33 and 34 at either end an a mid-portion 35 of lesser diameter constitute the outer surfaces of the hub member 30. A first control arm 36 extending outwardly is fixedly attached to the shoulder portion 33 and is connected to the bucket control rod 37 shown in FIGURE 3 through a nut and bolt fastener 38 and connecting linkage 38a. The connected control arm 36 can be attached to the end portion 33 in any suitable manner such as welding. It is further evident that the control arm 36 could be attached to the other shoulder portion 34 if so desired. As best shown in FIGURE 5 a pair of transverse bores 39 and 40 extending through the hub midportion 35 are in opposite alignment and determine a second axis 41 which will be discussed in detail further hereinafter. However, it should be noted at this time that the second axis 41 is transverse and intersects the first axis 21 at a point 42 indicated in FIGURES 3, 4 and 6.

An annular member 43 comprising an inner cylindrical surface 44 connected at either end to inner conical surfaces 45 and 46 are of different lengths and inclination but should be of such a length and inclination suitable for predetermined rotation of the annular member 43 about the axis 41. An outer peripheral surface 47 includes along its length a recess portion generally indicated by reference number 48. The recess portion 48 comprises an inner peripheral surface 49 connected to the outer peripheral surface 47 through side walls 50 and 51. A flange or shoulder portion having a shoulder face 53 and an outer surface 52 is connected to the surface 47. Two radial surfaces 54 and 55 connect the inner surfaces 45—46 and outer surfaces and 47 and 52 to complete the surface construction of the annular member 43. Transverse bores 43a and 43b in opposite alignment extend through the annular member 43 from the inner cylindrical surface 44 to the outer peripheral surface 49 of the recess portion 48. The transverse bores 43a and 43b correspond in diametrical size to the transverse bores 39 and 40 of the hub 30. A pair of hollow cylindrical pins 56 and 57 of equal diameter, the same length and beveled at either end are inserted through bores 43a, 43b, 39 and 40 to assemble the annular member 43 to the hub member 30. As best shown in FIGURE 5 the pins 56 and 57 abuttingly engage at their inner ends 56a and 57a the outer surface of shaft 20 and extend at their outer ends 56b and 57b into the recess portion 48 of the annular member 43 to align the transverse bores 39, 40, 43a and 43b along the second axis 41. Further it should be evident at this point to those skilled in the art that the annular member 43 can rotate about the axis 21 through the connection of pins 56 and 57 to the hub 30. It should also be evident that the conical internal surfaces 45 and 46 as best shown in FIGURES 3 and 4 provide limited rotation of the annular member 43 in either direction about the pins 56 and 57 lying on the second axis 41. An operator control lever 58 including a ball lever 59 at the operator end is attached to the radial face 54 in some suitable manner such as welding, and it is to provide operator controlled pivotal movement of the annular member 43 about the first axis 21 and the second axis 41 to be set forth in further detail hereinafter. However, it should be readily understood at this point that pivotal movement of the control lever 58 about axis 21 in a plane generally transverse to the supporting frame 12 rotates the annular member 43 which is connected to the hub member 30 including its first control arm 36 through pins 56 and 57. Additional pivotal movement of the control lever 58 in a longitudinal plane parallel to the first axis 21 simultaneously or independently to the control lever's generally transverse plane pivotal movement rotates the annular member 43 about the pins 56 and 57 on axis 41 limited only by the conical surfaces 45 and 46 contacting the hub mid-portion 35.

A circumferential ring 60 having an inner circumferential surface 61 and outer circumferential surface 62 connected to each other through radial faces 63 and 64 is assembled on the outer circumferential surface 47 adjacent the flange portion face 53. The inner circumferential surface 61 is the same diameter as the circumferential surface 47 to provide relative rotation between the ring 60 and the annular member 43. A pair of transverse bores 65 and 66 in opposite alignment and of equal diameter through the ring 60 determine a third axis 67 also transverse and intersecting at the point 42 on first axis 21.

Turning next to FIGURE 6 a perspective view is shown of the bail member 68 now to be discussed in detail. The bail member 68 comprises a U-shaped portion 69 and an L-shaped portion 70. At opposite ends of the U-shaped portion 49 are a pair of attached spacers 71 and 72 having respectively inner faces 78 and 79 which are attached in a suitable manner within the skill of the art such as welding. On the L-shaped portion 70 there is an aperture or transverse bore 74 on one of the leg portions and a second control arm 73 extending transversely outwardly on another of the leg portions. The aperture 74 determines a fourth axis 75 transverse to first axis 21 and intersecting also at point 42 that is to be discussed hereinafter further in detail.

Referring to FIGURES 1 and 5 the assembly of the bail member 68 to the multiple control mechanism will now be discussed in detail. Spacers 71 and 72 have aligned transverse bores 76 and 77 therethrough lying on the third axis 67 that are of the same size in diameter as bores 65 and 66 in the ring member 60. A pair of hollow pins 82 and 83 substantially the same length and corresponding in diameter to the hollow pins 56 and 57 are inserted in the bores 76 and 77 of the spacers and the bores 65 and 66 of the ring 60 and these pins 82 and 83 further extend into the recess portion 48 when the member 68 and ring 60 are assembled to the annular member 43. The outer surfaces 80 and 81 at the spacers 71 and 72 abuttingly engage the outer surface 62 of the ring 60 during the assembly of members 68 to annular member 43. Grease fittings 86 and 87 are inserted in threaded bores 84 and 85 at opposite ends of the V-shaped portion 69 to locate pins 82 and 83 against surface 49 of the recess portion 48 and to provide lubrication of working parts. Hollow pins 56 and 57 receiving lubricant from pins 82 and 83 provide lubrication of other working parts from recess portion 48 to shaft 20.

Bail member 68 is further mounted at its aperture 74 on the shaft portion 15 of the projection means 14 whereby the bail member 68 including control arm 73 and its connected accessory control rod 97 through linkage 96 rotate about the fourth axis 75 during pivotal movement of the operator control lever 58 about the second axis 41. Thus it should be apparent at this point if the control lever 58 is pivoted only about first axis 21 in a generally transverse plane that annular member 43 rotates relative to the ring 60 and bail member 68 assembled to the pins 82 and 83 in view of the recess portion 48. Pins 56 and 57 rotating with the annular member 43 limit pivotal movement of the control lever 58 in either direction in a generally transverse plane when the extension portion of these pins 56 and 57 in the recess portion 48 contact pins 82 and 83 also extending into recess portion 48. Rotating pins 56 and 57 connected to hub member 30 rotate the first control arm 36 about the first axis 21. Then if the control lever 58 is pivoted in a longitudinal plane parallel to the first axis 21, annular member 43 will rotate about pins 56 and 57 on the second axis 41 to rotate the bail member 68 and ring member 60 as a unit about the fourth axis 75 in view of the pins 82 and 83 on third axis 67 in the recess portion 48 of the annular member 43. Rotation of the bail member 68 including its second control arm 73 about fourth axis 75 actuates the accessory control rod 97 through connecting linkage 96. It should now be apparent that the third axis 67 and fourth axis 75, perpendicular to each other and intersecting at point 42, determine a plane that rotates about the fourth axis 75 during pivotal movement of the operator control lever 58 about the second axis 41.

The interrelationship of all four axes 21, 41, 67 and 75 intersecting at point 42 can now be further understood in referring particularly to FIGURES 5 and 6. Pivotal movement only of the lever 58 about the first axis 21 results in rotational movement of the first control arm 36 as indicated by the rotational arrow 90. Pivotal movement of the lever 58 about the second axis 41 simultaneously or independently of the pivotal movement of the lever 58 about the first axis 21 results in rotational movement of the second control arm 73 about the fourth axis as indicated by the rotational arrow 92.

In view of the above foregoing detailed description an operation of the multiple control mechanism will now be discussed below to understand clearly the present invention. When control lever 58 is pivotally moved about axis 21 in a generally transverse plane in either direction to the supporting frame 11 pins 56 and 57 connect rotation of the annular member to the hub 30 to actuate first control arm 36 and the bucket control rod 37. No rotation from the annular member 43 is transmitted to the ring member 60 in view of the recess portion 48 as evident in FIGURES 1 and 5. The other pin members 82 and 83 lying on axis 67 will prevent the complete rotation of the annular member 43 about the axis 21 since the extension portions of these pins 82 and 83 in recess portion 48 will eventually contact pins 56 and 57 on rotating axis 41 extending into the recess portion 48. Thus the recess portion 48 in annular member 43 provides independent rotatable actuation of the first control arm 36 as indicated by rotational arrow 90 to move connecting linkage 38a in linear direction as indicated by arrow 98. If the control lever 58 is pivotally moved only in a generally transverse plane of rotation about axis 21, during this pivotal movement in the transverse plane, second axis 41 best shown in FIGURE 5 is rotatably moved from a horizontal position to an angular position as indicated by arrow 41a.

If the control lever 58 is pivotally moved in either direction in a longitudinal plane which is parallel to the longitudinal axis 21, the lever 58 will rotate about pins 56 and 57, lying on the axis 41; with the lever rotation limited only by the conical surfaces 45 and 46 of the annular member 43 contacting the hub mid-portion 30. However, the pin members 82 and 83 lying on the third axis 67 will connect the yoke member 68 and the ring member 60 into one unit so as to rotate only about the longitudinal axis 75 indicated by rotational arrow 92 and in turn actuate the second control rod 97 in linear direction as indicated by arrow 99 through control arm 73 and connecting linkage 96 as clearly evident in FIGURES 3 and 4. Thus the control lever 58 by pivotally moving in either direction in a longitudinal plane parallel to the transverse plane will independently actuate the second control arm 73 and in turn the accessory control rod 97.

It should now be readily apparent in the art that irrespective of the position of the pins 56 and 57 on second axis 41 rotating about the axis 21 to actuate the first control arm 36 including the bucket control rod 37 that the control lever 58 can also simultaneously pivotally move in a longitudinal plane about the second axis 41 to rotate simultaneously the second control arm 73 including the accessory control rod 97 about the fourth axis 75.

From the foregoing it will be seen that this invention is one well adapted to obtain all of the ends and objects hereinabove set forth together with other advantages which are obvious and which are adherent to the structure.

In view of the various modifications of the invention which will occur to those skilled in the art upon consideration of the foregoing disclosure without departing from the spirit or scope thereof, only such limitations should be imposed as are indicated by the appended claims.

This invention having been described, what is claimed is:

1. In a multiple control mechanism comprising a fixed support including a pair of spaced-apart outwardly extending members, a shaft having a first longitudinal axis fixedly mounted between said members, a hub having a first control arm at one end mounted for relative rotation about said first axis on said shaft, a first pair of aligned and spaced-apart members extending outwardly from said hub and lying on a second axis transverse and intersecting said first axis at a point, a first annular member having an outer peripheral surface and including a control lever connected to said hub by said first pair of aligned members, said control lever having a pivotal movement providing independent or simultaneous rotation of said first annular member about said first and second axes, said peripheral surface comprising an annular recess portion and an annular shoulder portion, said portions being spaced apart from each other, a second pair of spaced-apart and aligned members lying on a third axis transverse and intersecting said first axis at said point, a second annular member including a first pair of opposite aligned transverse apertures, said second annular member being concentrically and rotatably mounted on said peripheral surface substantially against said shoulder portion, a bail member including a U-shaped and an L-shaped portion, a pair of attached spacers at opposite ends of said U-shaped portion, said spacers including a second pair of opposite aligned transverse apertures, said second pair of aligned members extending through said aligned apertures and projecting into said recessed portion to connect said bail member and said second annular member to said first annular member for relative rotation therebetween, said L-shaped portion including a second control arm extending outwardly and having an aperture, means projecting from said support into said latter aperture providing a fourth longitudinal axis which intersects and is transverse to said first axis at said point whereby said bail member is rotatably mounted on said support, said first and second control arms being simultaneously or independently rotatable about said first and fourth axis during pivotal movement of said control lever about said first and second axis.

2. In a multiple control mechanism comprising a fixed support including a pair of spaced-apart outwardly extending members, a shaft having a first longitudinal axis fixedly mounted between said members, a hub having a first control arm at one end mounted for relative rotation about said first axis on said shaft, a first pair of aligned and spaced-apart members extending outwardly from said hub and lying on a second axis transverse and intersecting said first axis at a point, a first annular member having an outer peripheral surface and including a control lever connected to said hub by said first pair of aligned members, said control lever having a pivotal movement providing independent or simultaneous rotation of said first annular member about said first and second axes, said peripheral surface comprising an annular recess portion and an annular shoulder portion, said portions being spaced apart from each other, a second pair of spaced-apart and aligned members lying on a third axis transverse and intersecting said first axis, a second annular member including a first pair of opposite aligned transverse apertures, said second annular member being rotatably mounted on said peripheral surface substantially against said shoulder portion, a bail member including a U-shaped and an L-shaped portion, said U-shaped portion including a second pair of opposite aligned transverse apertures, said second pair of aligned members extending through said first and second apertures and projecting into said recessed portion to connect said bail member and said second annular member to said first annular member for relative rotation therebetween, said L-shaped portion including a second control arm extending outwardly and having an aperture, means projecting from said support into said latter aperture providing a fourth longitudinal axis which intersects and is transverse to said first axis, whereby said bail member is rotatably mounted on said support, said third and fourth axis being perpendicular to each other and further determining a plane which is rotatable about said fourth axis during rotation of said bail member, so that said first and second control arms are simultaneously or independently rotatable about said first and fourth axis during pivotal movement of said control lever about said first and second axis.

3. In a multiple control mechanism comprising a fixed support including a pair of spaced-apart outwardly extending members, a cylindrical member providing a first control arm and having a first longitudinal axis rotatably mounted between said members, a first pair of aligned and spaced-apart members extending outwardly from said cylindrical member and lying on a second axis transverse and intersecting said first axis at a point, a first annular member having an outer peripheral surface and including a control lever connected to said cylindrical member by said first pair of aligned members, said control lever having a pivotal movement providing independent or simultaneous rotation of said first annular member about said first and second axes, said peripheral surface comprising an annular recess portion and an annular shoulder portion, said portions being spaced apart from each other, a second pair of spaced-apart and aligned members lying on a third axis transverse to said first axis, a second annular member including a first pair of opposite aligned transverse apertures, said second annular member rotatably mounted on said peripheral surface substantially against said shoulder portion, a bail member including a U-shaped and an L-shaped portion, said U-shaped portion including a second pair of opposite aligned transverse apertures, said second pair of aligned members extending through said first and second apertures and projecting into said recessed portion to connect said bail member and said second annular member to said first annular member for relative rotation therebetween, said L-shaped portion including a second control arm extending outwardly and having an aperture, means projecting from said support into said latter aperture providing a fourth longitudinal axis which is transverse to said first axis whereby said bail member is rotatably mounted on said support, said third and fourth axis intersecting each other and determining a plane which is rotatable about said fourth axis during rotation of said bail member, and said first and second control arms being simultaneously or independently rotatable about said first and fourth axis during pivotal movement of said control lever about said first and second axis.

4. In a multiple control mechanism comprising a fixed support including a pair of spaced-apart outwardly extending members, a cylindrical member providing a first control arm and having a first longitudinal axis rotatably mounted between said members, a first pair of aligned and spaced-apart members extending outwardly from said cylindrical member and lying on a second axis transverse and intersecting said first first axis at a point, a first annular member having an outer peripheral surface and including a control lever connected to said cylindrical member by said first pair of aligned members, said control lever having a pivotal movement providing independent or simultaneous rotation of said first annular member about said first and second axes, said peripheral surface comprising an annular recess portion and an annular shoulder portion, said portions being spaced apart from each other, a second pair of spaced-apart and aligned members lying on a third axis transverse to said first axis, a second annular member including a first pair of opposite aligned transverse apertures, said second annular member rotatably mounted on said peripheral surface substantially against said shoulder portion, a bail member including a U-shaped and L-shaped portion, said U-shaped portion including a second pair of opposite aligned transverse apertures, said second pair of aligned members extending through said first and second apertures and projecting into said recessed portion to connect said bail member and said second annular member to said first annular member for relative rotation therebetween, said L-shaped portion including a second control arm extending outwardly and having an aperture, means projecting from said support into said latter aperture providing a fourth longitudinal axis which is transverse to said first axis, whereby said bail member is rotatably mounted on said support, said third and fourth axis being perpendicular to each other and further determining a plane which is rotatable about said fourth axis during rotation of said bail member, so that said first and second control arms are simultaneously or independently rotatable about said first and fourth axis during pivotal movement of said control lever about said first and second axis.

5. In a multiple control mechanism comprising a fixed support including a pair of spaced-apart outwardly extending members, a cylindrical member having a first longitudinal axis rotatably mounted between said members, a first pair of aligned and spaced-apart members extending outwardly from said cylindrical member and lying on a second axis transverse and intersecting said first axis at a point, a first annular member having an outer peripheral surface and including a control lever connected to said cylindrical member by said first pair of aligned members, said control lever having a pivotal movement providing independent or simultaneous rotation of said first annular member about said first and second axes, said peripheral surface comprising an annular recess portion and an annular shoulder portion, said portions being spaced apart from each other, a second pair of spaced-apart and aligned members lying on a third axis which is transverse to said first axis, a second annular member including a first pair of opposite aligned transverse apertures, said second annular member rotatably mounted on said peripheral surface substantially against said shoulder portion, a bail member including a U-shaped and an L-shaped portion, said U-shaped portion including a second pair of opposite aligned transverse apertures, said second pair of aligned members extending through said first and second apertures and projecting into said recessed portion to connect said bail member and said second annular member to said first annular member for relative rotation therebetween, said L-shaped portion including a control arm extending outwardly and having an aperture, means projecting from said support into said latter aperture providing a fourth longitudinal axis which is transverse to said first axis, whereby said bail member is rotatably mounted on said support, said third and fourth axis intersecting each other and determining a plane, whereby said control arm and said plane being rotatable about said fourth axis during pivotal movement of said control lever about said second axis.

6. In a multiple control mechanism comprising a fixed support including a pair of spaced-apart outwardly extending members, a cylindrical member including a first control arm and having a first longitudinal axis rotatably mounted between said members, a first pair of aligned and spaced-apart members extending outwardly from said cylindrical member and lying on a second axis transverse and intersecting said first axis at a point, a first annular member having an outer peripheral surface and including a control lever connected to said cylindrical member by said first pair of aligned members, said control lever having a pivotal movement providing independent or simultaneous rotation of said first annular member about said first and second axes, said peripheral surface comprising an annular recess portion and an annular shoulder portion, said portions being spaced apart from each other, a second pair of spaced-apart and aligned members lying on a third axis which is transverse to said first axis, a second annular member having an outer bail member and including a pair of opposite aligned transverse apertures, said second annular member rotatably mounted on said peripheral surface substantially against said shoulder portion, said second pair of aligned members extending through said apertures and projecting into said recessed portion to connect said bail member and said second annular member to said first annular member for relative rotation therebetween, said bail member including a second control arm extending outwardly and having an aperture at one end means projecting from said support into said latter aperture providing a fourth longitudinal axis which is transverse to said first axis, whereby said bail member is rotatably mounted on said support, said third and fourth axis intersecting each other and determining a plane; so that said first arm, and said plane and said second arm are simultaneously or independently rotatable about said first and fourth axis during pivotal movement of said control lever about said first and second axis.

7. In a multiple control mechanism comprising a fixed support including a pair of spaced-apart outwardly extending members, a cylindrical member providing a first control arm and having a first longitudinal axis rotatably mounted between said members, a first pair of aligned and spaced-apart members extending outwardly from said cylindrical member and lying on a second axis transverse and intersecting said first axis at a point, a first member having an outer peripheral surface and including a control lever connected to said cylindrical member by said first pair of aligned members, said control lever having a pivotal movement providing independent or simultaneous rotation of said first member about said first and second axes, a second member having an inner peripheral surface which is mounted on said outer surface for relative rotation therebetween, one of said surfaces providing an annular recessed portion and a shoulder portion which is substantially spaced apart from said recessed portion, a second pair of spaced-apart and aligned members lying on a third axis transverse to said first axis, one of said first or second members including a first pair of opposite aligned transverse apertures, said second pair of aligned members extending through said apertures in one of said members and projecting into said recessed portion to connect said second member to said first member for relative rotation therebetween about said first axis, said second member further including an outer extended member, said outer member providing a second control arm and an aperture, projection means from said support into said latter aperture providing a fourth longitudinal axis which is transverse to said first axis whereby said outer member is rotatably mounted on said support, said first and second control arms being simultaneously or independently rotatable about said first and fourth axis during pivotal movement of said control lever about said first and second axis.

8. In a multiple control mechanism comprising a fixed support including a pair of spaced-apart outwardly extending members, a cylindrical member providing a first control arm and having a first longitudinal axis rotatably mounted between said members, a first pair of aligned and spaced-apart members extending outwardly from said cylindrical member and lying on a second axis transverse and intersecting said first axis at a point, a first member having an outer peripheral surface and including a control lever connected to said cylindrical member by said first pair of aligned members, said control lever having a pivotal movement providing independent or simultaneous rotation of said first member about said first and second axes, a second member having an inner peripheral surface which is mounted on said outer surface for relative rotation therebetween, one of said surfaces providing an annular recessed portion, the other of said surfaces providing a shoulder portion which is substantially adjacent an outer face of one of said first or second members, a second pair of spaced-apart and aligned members lying on a third axis transverse to said first axis, one of said first or second members including a pair of opposite aligned transverse apertures, said second pair of aligned members extending through said apertures in one of said members and projecting into said recessed portion to connected said second member to said first member for relative rotation therebetween, said second member further including an outer extended member, said outer member providing a second control arm and an aperture, projection means from said support into said latter aperture providing a fourth longitudinal axis which is transverse to said first axis, whereby said outer member is rotatably mounted on said support, and said first and second control arms being simultaneously or independently rotatable about said first and fourth axis during pivotal movement of said control lever about said first and second axis.

9. In a multiple control mechanism comprising a fixed support including a pair of spaced-apart outwardly extending members, a cylindrical member providing a first control arm and having a first longitudinal axis rotatably mounted between said members, a first pair of aligned and spaced-apart members extending outwardly from said cylindrical member and lying on a second axis transverse and intersecting said first axis at a point, a first member having an outer peripheral surface and including a control lever connected to said cylindrical member by said first pair of aligned members, said control lever having a pivotal movement providing independent or simultaneous rotation of said first member about said first and second axes, a second member having an inner peripheral surface which is mounted on said outer surface for relative rotation therebetween, one of said surfaces providing an annular recessed portion, the other of said surfaces providing a shoulder portion which is substantially adjacent an outer face of one of said first or second members, a second pair of spaced-apart and aligned members lying on a third axis transverse to said first axis, said second member including a pair of opposite aligned transverse apertures, said second pair of aligned members extending from and through said apertures in said second member and projecting into said recessed portion to connect said second member to said first member, said first pair of aligned members further projecting outwardly from said first member into said recessed portion, said second pair of aligned members permitting relative rotation between said connected members up to said first pair of aligned members, said second member further including on outer extended member, said outer member providing a second control arm and an aperture, projection means from said support into said latter aperture providing a fourth longitudinal axis which is transverse to said first axis, whereby said outer member is rotatably mounted on said support, and said first and second control arms being simultaneously or independently rotatable about said first and fourth axis during pivotal movement of said control lever about said first and second axis.

10. In a multiple control mechanism comprising a fixed support including a pair of spaced-apart outwardly extending members, a cylindrical member including a first longitudinal axis is rotatably mounted between said members, a first pair of aligned and spaced-apart members extending outwardly from said cylindrical member and lying on a second axis transverse to said first axis in a first direction, a first annular member having an outer peripheral surface and including a control lever connected to said cylindrical member by said first pair of aligned members, said control lever having a pivotal movement providing independent or simultaneous rotation of said first member about said first and second axes, a second member having an inner peripheral surface which is mounted on said outer surface for relative rotation therebetween, one of said surfaces providing an annular recessed portion, the other of said surfaces providing a shoulder portion which is substantially adjacent an outer face of one of said first or second members, a second pair of spaced-apart and aligned members lying on a third axis transverse to said first axis in a second direction, said second member including a pair of opposite aligned transverse apertures, said second pair of aligned members extending from and through said apertures in said second member and projecting into said recessed portion to connect said second member to said first member, said first pair of aligned members further projecting outwardly from said first member into said recessed portion, said second pair of aligned members permitting relative rotation between said connected members up to said first pair of aligned members, said second member further including an outer extended member, said outer member providing a control arm and an aperture, projection means from said support into said latter aperture providing a fourth longitudinal axis which is transverse to said first axis in a third direction, whereby said outer member is rotatably mounted on said support, and said control arm being rotatable about said fourth axis during pivotal movement of said control lever about said second axis.

References Cited in the file of this patent

UNITED STATES PATENTS

| | | |
|---|---|---|
| 1,557,214 | McClane | Oct. 13, 1925 |
| 2,396,309 | Wodal | Mar. 12, 1946 |
| 2,463,181 | Kaiser | Mar. 1, 1949 |
| 2,621,534 | Martin | Dec. 16, 1952 |
| 2,877,660 | Rush | Mar. 17, 1959 |
| 2,929,258 | Mackway | Mar. 22, 1960 |

FOREIGN PATENTS

| | | |
|---|---|---|
| 564,666 | Italy | June 26, 1957 |